United States Patent
Ripley et al.

(10) Patent No.: US 10,287,028 B2
(45) Date of Patent: May 14, 2019

(54) SYSTEM AND METHOD TO DETECT SHUTOFF VALVE FAILURES

(71) Applicant: United Technologies Corporation, Farmington, CT (US)

(72) Inventors: David Lloyd Ripley, San Diego, CA (US); Michael E. Mehrer, San Diego, CA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 247 days.

(21) Appl. No.: 15/110,842

(22) PCT Filed: Jan. 9, 2015

(86) PCT No.: PCT/US2015/010894
§ 371 (c)(1),
(2) Date: Jul. 11, 2016

(87) PCT Pub. No.: WO2015/106153
PCT Pub. Date: Jul. 16, 2015

(65) Prior Publication Data
US 2016/0325843 A1 Nov. 10, 2016

Related U.S. Application Data

(60) Provisional application No. 61/925,837, filed on Jan. 10, 2014.

(51) Int. Cl.
F02C 1/00 (2006.01)
B64D 37/32 (2006.01)
(Continued)

(52) U.S. Cl.
CPC ............. B64D 37/32 (2013.01); B64D 27/10 (2013.01); B64D 41/00 (2013.01); F01D 21/003 (2013.01);
(Continued)

(58) Field of Classification Search
CPC .. F01D 21/003; F02D 41/221; F05D 2260/83; F05D 2260/80; F05D 2270/021;
(Continued)

(56) References Cited

U.S. PATENT DOCUMENTS 4,716,723 A * 1/1988 Ralston ............... F01D 21/02
60/39.281
5,927,064 A * 7/1999 Dyer ................. F01D 21/02
60/39.281
(Continued)

FOREIGN PATENT DOCUMENTS

EP 1327063 A1 7/2003
EP 1411226 A1 4/2004
WO 200201055 A1 1/2002

OTHER PUBLICATIONS

Supplementary European Search Report Application No. EP15735155; dated Sep. 29, 2017; pp. 9
International Search Report for International Application No. PCT/US2015/010894; dated Apr. 29, 2015.
Written Opinion for International Application No. PCT/US2015/010894; dated Apr. 29, 2015.

Primary Examiner — Jesse S Bogue
(74) Attorney, Agent, or Firm — Cantor Colburn LLP

(57) ABSTRACT

The present disclosure relates generally to system and method for detecting fuel shutoff valve failures in a system including multiple fuel shutoff valves connected in series. By commanding different fuel shutoff valves to close and detecting changes in the system operating conditions, the system and method may determine if any of the fuel shutoff valves are not working properly.

20 Claims, 5 Drawing Sheets

(51) Int. Cl.
*F02D 41/22* (2006.01)
*F02C 7/232* (2006.01)
*B64D 27/10* (2006.01)
*B64D 41/00* (2006.01)
*F01D 21/00* (2006.01)
*F02C 9/28* (2006.01)

(52) U.S. Cl.
CPC ............... *F02C 7/232* (2013.01); *F02C 9/28* (2013.01); *F02D 41/221* (2013.01); *F02D 2200/0602* (2013.01); *F02D 2200/101* (2013.01); *F05D 2220/50* (2013.01); *F05D 2260/80* (2013.01); *F05D 2260/83* (2013.01); *F05D 2270/021* (2013.01); *F05D 2270/3013* (2013.01); *Y02T 10/40* (2013.01)

(58) Field of Classification Search
CPC .... F05D 2270/301; Y02T 10/40; F02C 7/232; F02C 9/263; F02C 9/28; G01M 15/14
See application file for complete search history.

(56) References Cited

U.S. PATENT DOCUMENTS

| | | | |
|---|---|---|---|
| 6,915,639 | B1 | 7/2005 | Linebrink |
| 8,297,036 | B2* | 10/2012 | Vanderleest ............ F02C 7/232 60/39.091 |
| 8,925,329 | B2* | 1/2015 | Godel .................. F01D 21/003 60/778 |
| 2005/0109038 | A1* | 5/2005 | Matthews ............... F01D 21/16 60/779 |
| 2006/0130455 | A1* | 6/2006 | Griffiths ................ F02C 7/228 60/39.281 |
| 2007/0055435 | A1 | 3/2007 | Muramatsu et al. |
| 2008/0163931 | A1* | 7/2008 | Brocard ................ F02C 9/263 137/10 |
| 2011/0041512 | A1* | 2/2011 | Tezuka ..................... F02C 9/28 60/779 |

* cited by examiner

SYSTEM AND METHOD TO DETECT SHUTOFF VALVE FAILURES

CROSS REFERENCE TO RELATED APPLICATION

This application is a National Phase Application of Patent Application PCT/US2015/010894 filed on Jan. 9, 2015, which claims the benefit of and incorporates by reference herein the entire contents of U.S. Ser. No. 61/925,837, filed Jan. 10, 2014 and the entire contents of PCT Application Number PCT/US2015/010894.

TECHNICAL FIELD OF THE DISCLOSURE

The present disclosure is generally related to engine fuel systems and, more specifically, to a system and method for detecting shutoff valve failures.

BACKGROUND OF THE DISCLOSURE

Most combustion engines have fuel systems that deliver fuel to the engine in metered amounts, where the fuel delivery may be controlled by an engine management system. Gas turbine engines, such as auxiliary power units (APUs), are used as an example herein, but those skilled in the art will recognize that the systems and methods disclosed herein may be used with any fuel delivery system. APUs are typically used by aircraft to provide electrical and/or pneumatic power to aircraft for various uses. A typical APU consists of a gas turbine engine that rotates at high speed during operation. To prevent overspeed of the engine, the APU is designed to not only control speed but to also have redundant shut down capability. Such redundant shut down capability consists of a minimum of two separate systems, each capable of shutting down the APU. Each independent system must not have a latent failure potential that in and of itself could lead to overspeed of the APU from a single event failure.

APUs typically contain a fuel metering valve to meter fuel flow to the APU's combustor and one or more fuel shutoff solenoid valves to allow or prevent fuel flow. If the fuel metering valve sticks in the open position, an APU overspeed condition could result. To prevent overspeed in this case, the fuel shutoff solenoid valve must be commanded closed. To prevent latent failure of the fuel shutoff solenoid valve, proper operation of the fuel shutoff solenoid valve is typically checked during each APU commanded shutdown.

SUMMARY OF THE DISCLOSURE

In one embodiment, a method for detecting shutoff valve failures in an engine fuel system is disclosed, the method comprising the steps of: commanding a secondary fuel shutoff valve to close; determining if a speed of the engine drops a first percentage within a first time period responsive to the commanding the secondary fuel shutoff valve to close; detecting that the secondary fuel shutoff valve is not operating correctly based on determining that the engine speed did not drop the first percentage within the first time period; commanding a primary fuel shutoff valve to close; determining if a fuel pressure at the primary shutoff valve output exhibits at least a differential pressure drop within a second time period responsive to the commanding the primary fuel shutoff valve to close; and detecting that the primary fuel shutoff valve is not operating correctly based on determining that the fuel pressure did not exhibit the differential pressure drop within the second time period.

In a further embodiment of the above, the engine comprises a gas turbine auxiliary power unit mounted in an aircraft.

In a further embodiment of any of the above, the steps are performed when the aircraft is on the ground.

In a further embodiment of any of the above, the primary and secondary fuel shutoff valves comprise solenoid fuel shutoff valves.

In another embodiment, a method for detecting shutoff valve failures in an engine fuel system is disclosed, the method comprising the steps of: during a first test: commanding a secondary fuel shutoff valve to close; determining if a speed of the engine drops a first percentage within a first time period responsive to the commanding the secondary fuel shutoff valve to close; detecting that the secondary fuel shutoff valve is not operating correctly based on determining that the engine speed did not drop the first percentage within the first time period; and during a second test subsequent to the first test: commanding a primary fuel shutoff valve to close; determining if a speed of the engine drops a second percentage within a second time period responsive to the commanding the primary fuel shutoff valve to close; and detecting that the primary fuel shutoff valve is not operating correctly based on determining that the engine speed did not drop the second percentage within the second time period.

In a further embodiment of the above, the first percentage is equal to the second percentage.

In a further embodiment of any of the above, the first time period is equal to the second time period.

In a further embodiment of any of the above, the engine comprises a gas turbine auxiliary power unit mounted in an aircraft.

In a further embodiment of any of the above, the steps are performed when the aircraft is on the ground.

In a further embodiment of any of the above, the primary and secondary fuel shutoff valves comprise solenoid fuel shutoff valves.

In another embodiment, a fuel system for an engine is disclosed, comprising: a primary fuel shutoff valve including a primary fuel shutoff valve output; a secondary fuel shutoff valve including a secondary fuel shutoff valve input operatively coupled to the primary fuel shutoff valve output; and a pressure sensor operative to sense a fuel pressure downstream from the primary fuel shutoff valve; wherein the system is configured to: command the secondary fuel shutoff valve to close; determine if a speed of the engine drops a first percentage within a first time period responsive to the commanding the secondary fuel shutoff valve to close; detect that the secondary fuel shutoff valve is not operating correctly based on determining that the engine speed did not drop the first percentage within the first time period; command the primary fuel shutoff valve to close; determine if the fuel pressure exhibits at least a differential pressure drop within a second time period responsive to commanding the primary fuel shutoff valve to close; and detect that the primary fuel shutoff valve is not operating correctly based on determining that the fuel pressure did not exhibit the differential pressure drop within the second time period.

In a further embodiment of the above, the engine comprises a gas turbine auxiliary power unit mounted in an aircraft.

In a further embodiment of any of the above, the steps are performed when the aircraft is on the ground.

In a further embodiment of any of the above, the primary and secondary fuel shutoff valves comprise solenoid fuel shutoff valves.

In a further embodiment of any of the above, the system is further configured to: during a first test: command the secondary fuel shutoff valve to close; determine if a speed of the engine drops a second percentage within a third time period responsive to the commanding the secondary fuel shutoff valve to close; detect that the secondary fuel shutoff valve is not operating correctly based on determining that the engine speed did not drop the second percentage within the third time period; and during a second test subsequent to the first test: command the primary fuel shutoff valve to close; determine if a speed of the engine drops a third percentage within a fourth time period responsive to commanding the primary fuel shutoff valve to close; and detect that the primary fuel shutoff valve is not operating correctly based on determining that the engine speed did not drop the third percentage within the fourth time period.

In a further embodiment of any of the above, the second percentage is equal to the third percentage and the third time period is equal to the fourth time period.

In a further embodiment of any of the above, the engine comprises a gas turbine auxiliary power unit mounted in an aircraft.

In a further embodiment of any of the above, the steps are performed when the aircraft is on the ground.

In a further embodiment of any of the above, the primary and secondary fuel shutoff valves comprise solenoid fuel shutoff valves.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
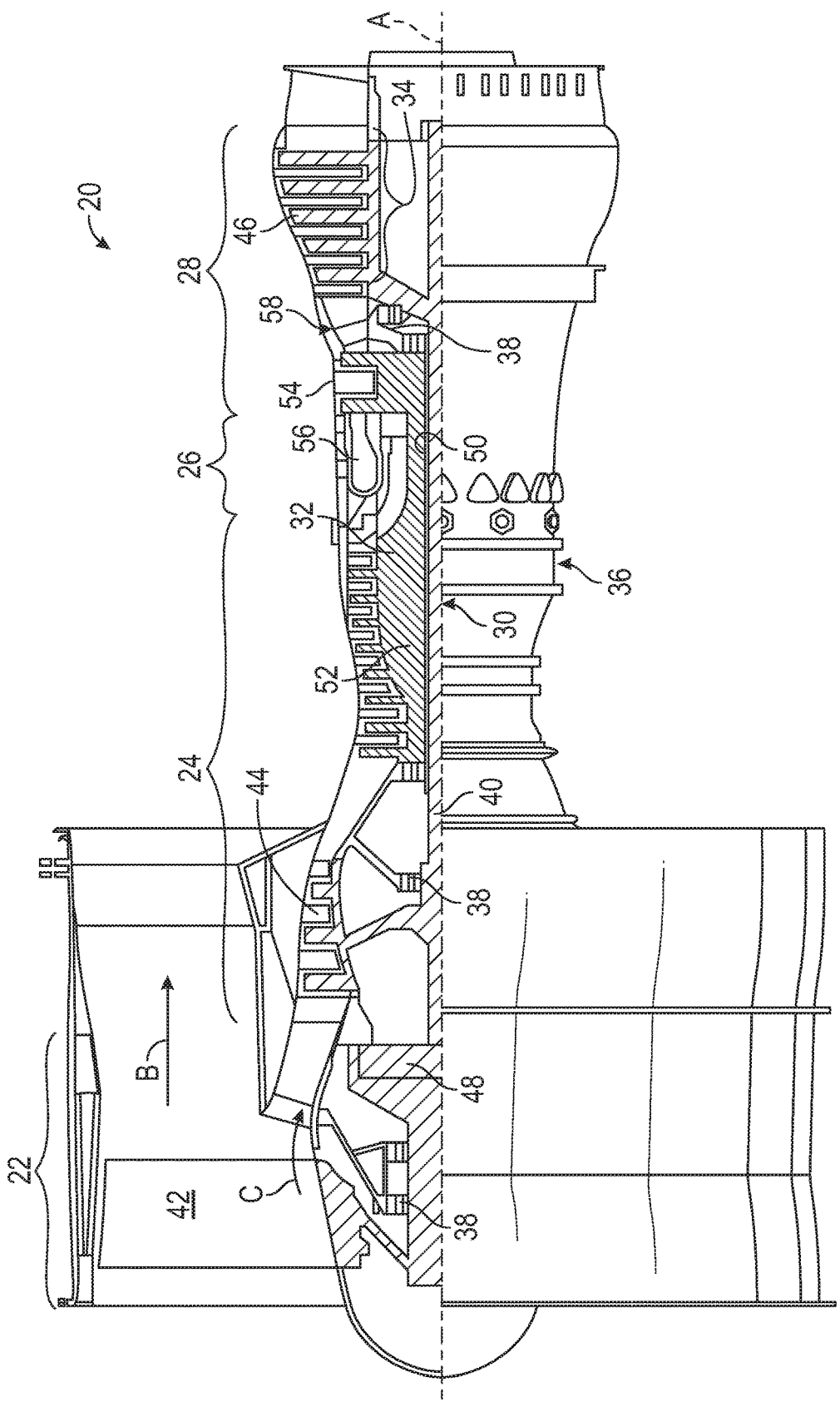
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
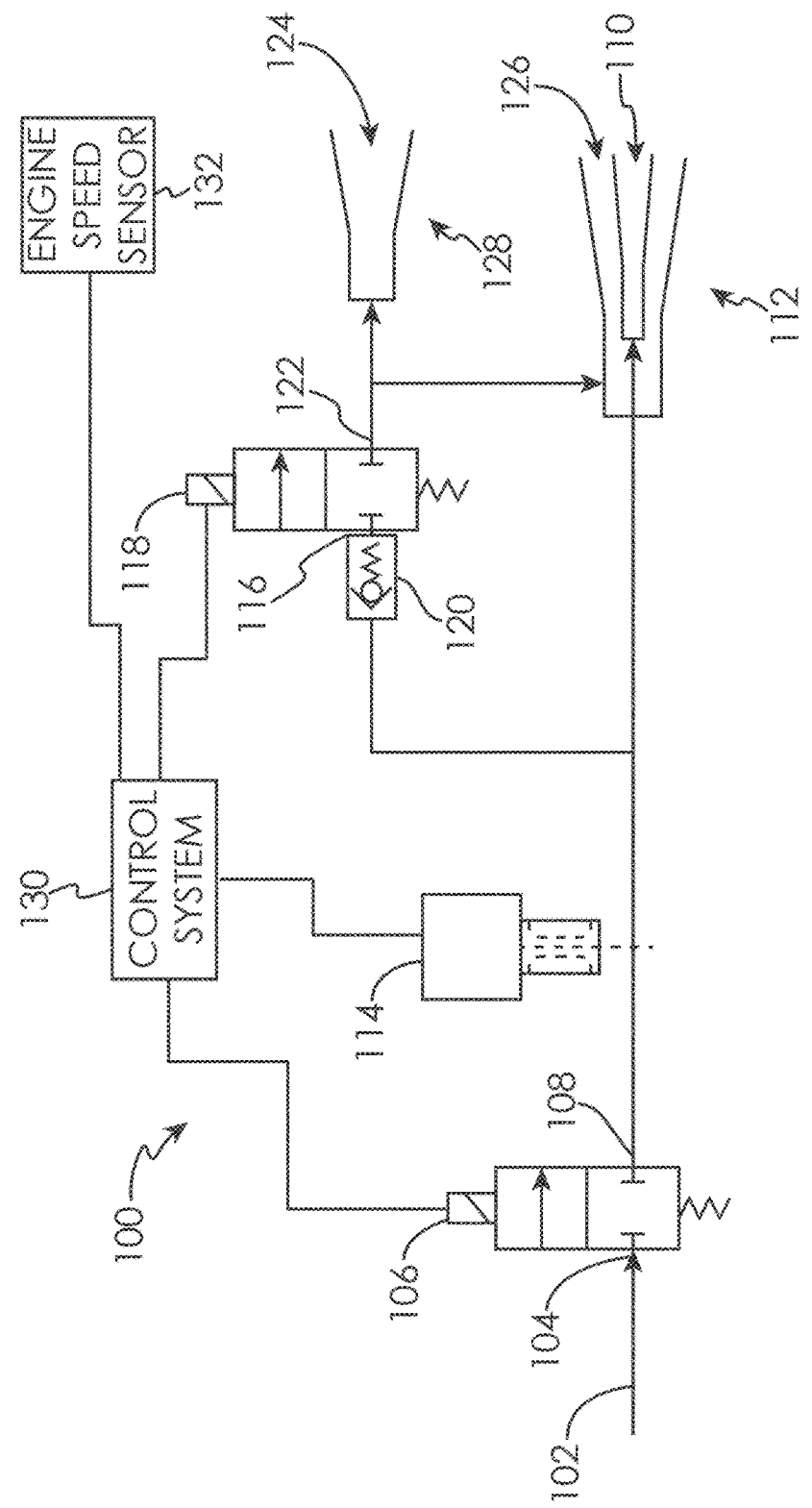
FIG. 2 is a schematic diagram of a fuel system in an embodiment.

The present disclosure provides a method that, during APU commanded shutdown, reliably checks multiple fuel shutoff solenoid valves in series for correct operation and to assure that no latent failures are present. It will be appreciated that the presently disclosed method may also be used with any fuel system for any engine in which fuel shutoff valves are provided in a series configuration. FIG. 2 schematically illustrates an engine fuel system indicated generally at 100. A supply of fuel under pressure is supplied at 102 to an input 104 of a primary fuel shutoff valve 106. Primary fuel shutoff valve 106 is a fuel shutoff valve in an embodiment, to name one non-limiting embodiment. An output 108 of the primary fuel shutoff valve 106 operatively supplies fuel to a first engine fuel supply port 110. The first engine fuel supply port 110 may comprise a primary nozzle of a duplex nozzle 112 in an embodiment. A pressure of the fuel exiting output 108 of the primary fuel shutoff valve 106 may be measured by fuel pressure sensor 114 in an embodiment.

The output 108 of the primary fuel shutoff valve 106 also operatively supplies fuel to an input 116 of a secondary fuel shutoff valve 118. Secondary fuel shutoff valve 118 is a fuel shutoff solenoid valve in an embodiment, to name one non-limiting example. Fuel from the output 108 may optionally pass through a flow divider valve 120 in an embodiment. An output 122 of the secondary fuel shutoff valve 118 operatively supplies fuel to a second engine fuel supply port 124 and to a third engine fuel supply port 126. The second engine fuel supply port 124 may comprise a simplex nozzle 128 in an embodiment. The third engine fuel supply port 126 may comprise a secondary nozzle of the duplex nozzle 112 in an embodiment.

In the exemplary embodiment, the first engine fuel supply port 110 is used to supply fuel to start the APU. Once the APU is running, it will require more fuel to continue running. Fuel from the output 122 of the secondary fuel shutoff valve 118 operatively supplies fuel to the second engine fuel supply port 124 and to the third engine fuel supply port 126 to maintain the APU in a running state. When the secondary fuel shutoff valve 118 closes and prevents fuel from being supplied to the second engine fuel supply port 124 and to the third engine fuel supply port 126, the APU engine speed will slow and eventually stop. Therefore, if either the primary shutoff valve 106 or the secondary shutoff valve 118 is closed, the APU will slow and eventually stop.

A control system 130 operatively coupled to fuel system 100, such as a control unit of the APU, may be used to test the fuel system 100 for proper functioning of the primary fuel shutoff valve 106 and the secondary fuel shutoff valve 118. Such testing may be done in order to verify that the primary fuel shutoff valve 106 and the secondary fuel shutoff valve 118 close and stop fuel flow as commanded by the control system. The control system 130 may be operatively coupled to the primary fuel shutoff valve 106 and the secondary fuel shutoff valve 118 for control of the opening and closing thereof. Alternatively, control system 130 may not control the opening and closing of the primary fuel shutoff valve 106 and the secondary fuel shutoff valve 118, but may instead sense such control commands issued by another system. Control system 130 may also be operatively coupled to the pressure sensor 114 and receive a fuel pressure reading therefrom in an embodiment. Control system 130 may additionally be coupled to an engine speed sensor 132 for receipt of an engine speed reading of an engine supplied by the fuel supply ports 110, 124, and 126 in an embodiment.

Figure 3:
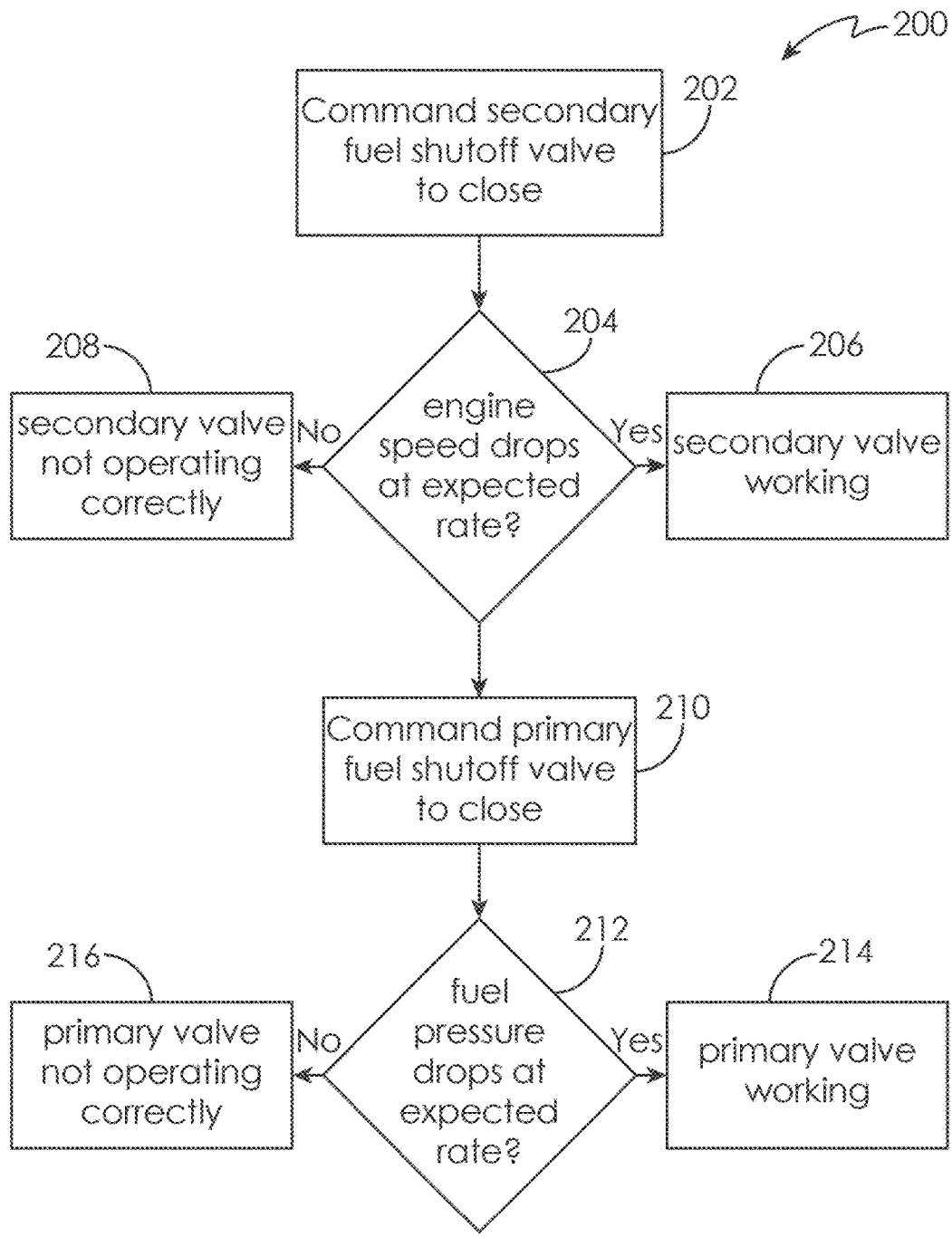
FIG. 3 is a schematic flow chart of a method for determining shutoff valve failures in an embodiment.
Figure 4:
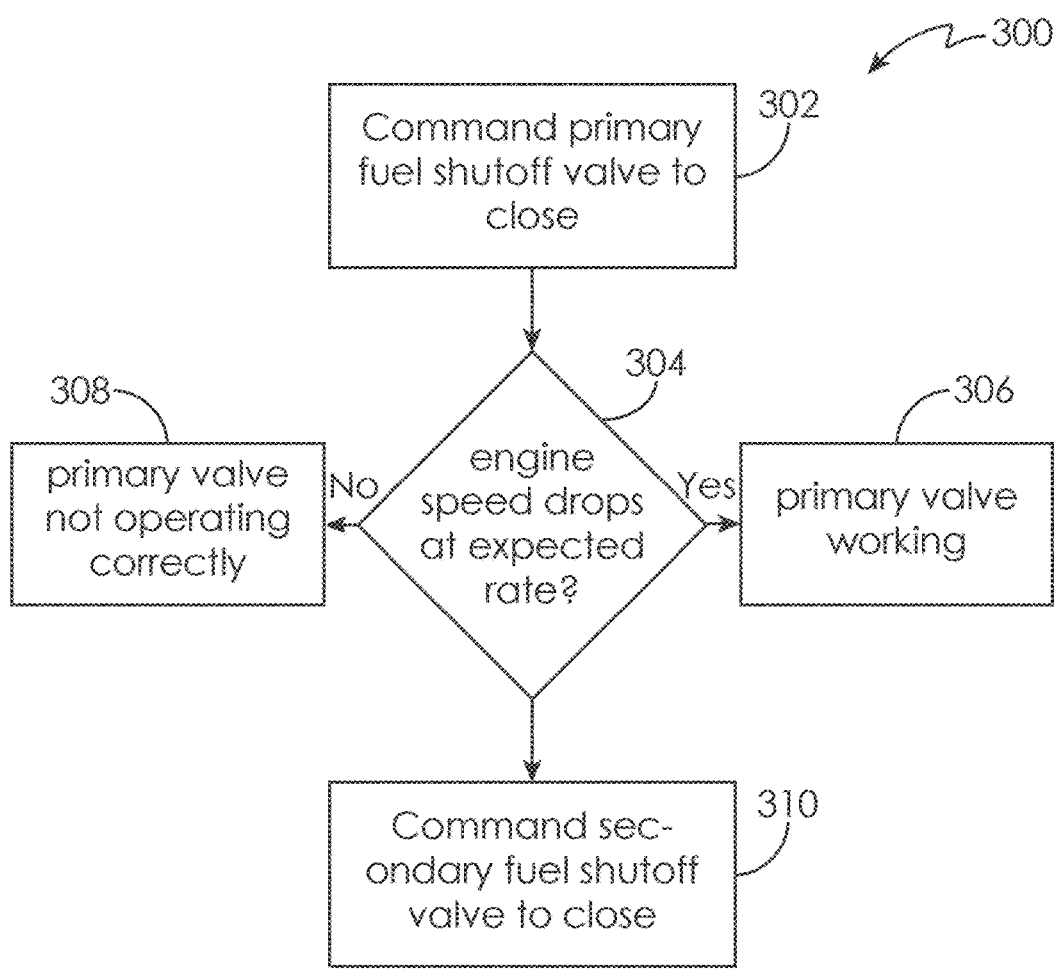
FIG. 4 is a schematic flow chart of a method for determining shutoff valve failures in an embodiment.
Figure 5:
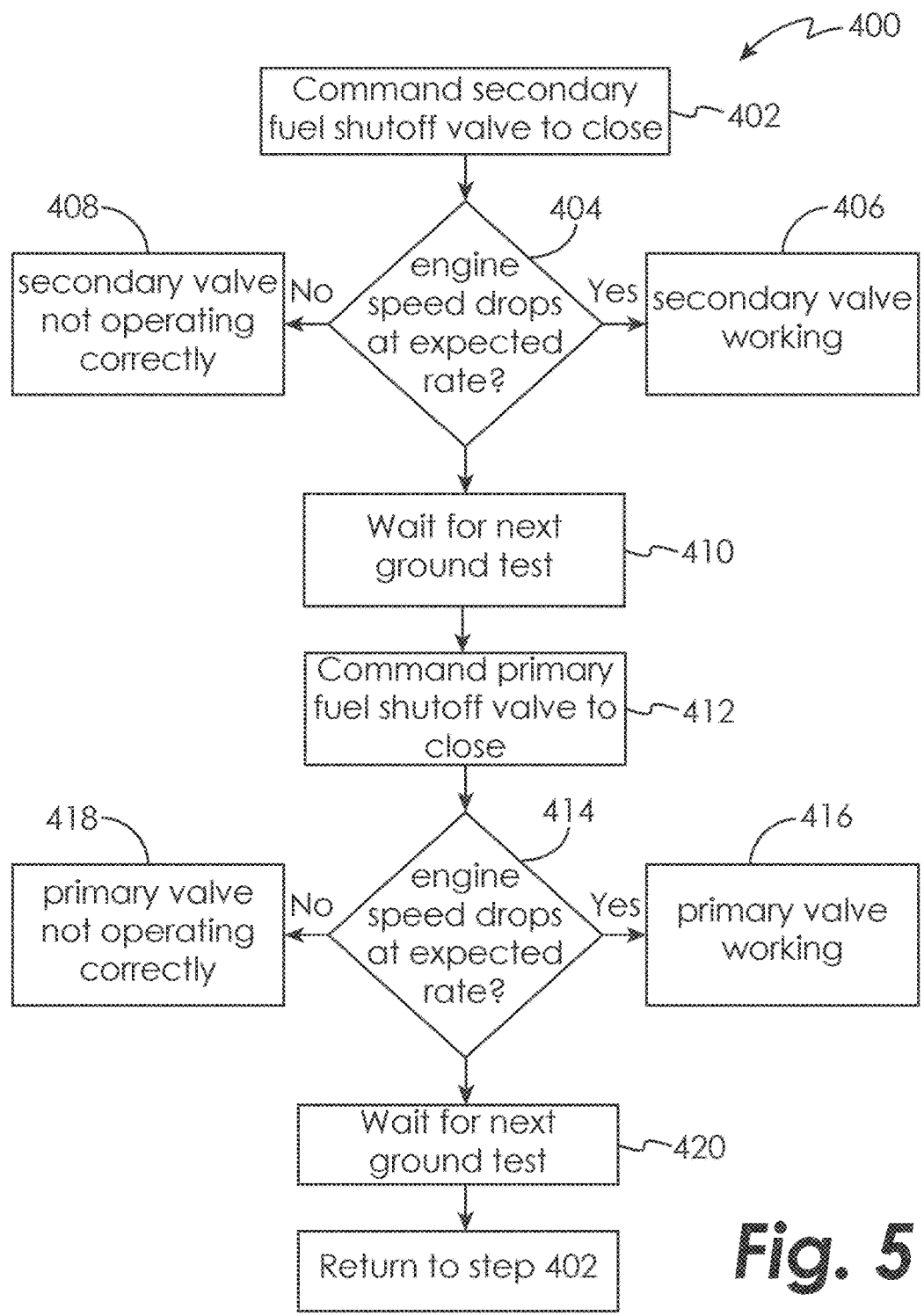
FIG. 5 is a schematic flow chart of a method for determining shutoff valve failures in an embodiment.

FIGS. 3-5 are process flows for methods that may be used to verify the closing of two valves in a series connection in a fuel system with and without primary fuel pressure feedback. The methods of FIGS. 3-4 provide verification of the operation of the two valves with fuel pressure feedback. The method of FIG. 5 may be employed and does not require fuel pressure feedback. The methods of FIGS. 3-5 are described in the context of testing an APU installed in an aircraft; however, it will be appreciated that the methods of FIGS. 3-5 may be used with any engine fuel system including two shutoff valves in series.

Referring now to FIG. 3, a method 200 for verifying the closing of two valves in a series connection in a fuel system with primary fuel pressure feedback is schematically illustrated. While the aircraft is on the ground, the secondary fuel shutoff valve 118 is commanded to close at block 202. The control system 130 then verifies that the engine speed drops a first percentage range within a first time period range at block 204. If the engine speed drops at the expected rate, then it may be determined at block 206 that the secondary fuel shutoff valve 118 is operating correctly (i.e., it is not stuck in the open position). If the engine speed does not drop at the expected rate, then it may be declared at block 208 that the secondary fuel shutoff valve 118 is not operating correctly (i.e., it is stuck in the open position or at least not closing completely).

The primary fuel shutoff valve 106 is commanded to close at block 210. At block 212, the control system 130 verifies, such as by reading fuel pressure sensor 114 in an embodiment, that the pressure of the fuel downstream from the primary fuel shutoff valve 106 exhibits a differential pressure drop range within a second time period range. If the fuel pressure drops at the expected rate, then it may be determined at block 214 that the primary fuel shutoff valve 106 is operating correctly (i.e., it is not stuck in the open position). If the fuel pressure does not drop at the expected rate, then it may be determined at block 216 that the primary fuel shutoff valve 106 is not operating correctly (i.e., it is stuck in the open position or may not be closing completely).

As shown in FIG. 4 and indicated at 300, further testing of the fuel system 100 may be conducted, such as while the aircraft is airborne. At altitude, many APUs do not require fuel from the secondary shutoff valve 118, therefore the secondary shutoff valve 118 may only be checked while the aircraft is on the ground. However overspeed protection still occurs when the primary shutoff valve 106 is tested as described in the method 300 and all fuel flow to the APU flows through the primary shutoff valve 106. At block 302, the primary fuel shutoff valve 106 is commanded to close. The control system 130 then verifies that the engine speed drops a second percentage range within a third time period range at block 304. If the engine speed drops at the expected rate, then it may be determined at block 306 that the primary fuel shutoff valve 106 is operating correctly (i.e., it is not stuck in the open position). If the engine speed does not drop at the expected rate, then it may be determined at block 308 that the primary fuel shutoff valve 106 is not operating correctly (i.e., it is stuck in the open position or at least not closing completely). Next, the secondary fuel shutoff valve 118 is commanded to close at block 310 to complete the shutdown procedure.

Referring now to FIG. 5, a method 400 for verifying the closing of two valves in a series connection in a fuel system without primary fuel pressure feedback is schematically illustrated according to an embodiment. While the aircraft is on the ground, the control system 130 will alternate between closing the primary fuel shutoff valve 106 and the secondary fuel shutoff valve 118. At block 402, the secondary fuel shutoff valve 118 is commanded to close. The control system 130 then verifies that the engine speed drops a third percentage range in a fifth time period range at block 404. If the engine speed drops at the expected rate, then it may be determined at block 406 that the secondary fuel shutoff valve 118 is operating correctly (i.e., it is not stuck in the open position). If the engine speed does not drop at the expected rate, then it may be determined at block 408 that the secondary fuel shutoff valve 118 is not operating correctly (i.e., it is stuck in the open position or may not be closing completely). The method 400 then waits at block 410 for the next APU ground shutdown before moving to block 412. At block 412, the primary fuel shutoff valve 106 is commanded to close. The control system 130 then verifies that the engine speed drops a fourth percentage range in a sixth time period range at block 414. If the engine speed drops at the expected rate, then it may be determined at block 416 that the primary fuel shutoff valve 106 is operating correctly (i.e., it is not stuck in the open position). If the engine speed does not drop at the expected rate, then it may be determined at block 418 that the primary fuel shutoff valve 106 is not operating correctly (i.e., it is stuck in the open position or may not be closing completely). At block 420 the control system 130 waits for the next APU ground shutdown before returning to block 402. Such consecutive ground tests limit the latent failure potential for each of the primary shutoff valve 106 and secondary shutoff valve 118 to consecutive ground shutdowns.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A method for detecting shutoff valve failures in an engine fuel system, the method comprising the steps of:
   commanding a secondary fuel shutoff valve to close;
   determining if a speed of the engine drops a first percentage within a first time period responsive to the commanding the secondary fuel shutoff valve to close;
   detecting that the secondary fuel shutoff valve is not operating correctly based on determining that the engine speed did not drop the first percentage within the first time period;
   commanding a primary fuel shutoff valve to close;
   determining if a fuel pressure at the primary shutoff valve output exhibits at least a differential pressure drop within a second time period responsive to the commanding the primary fuel shutoff valve to close; and
   detecting that the primary fuel shutoff valve is not operating correctly based on determining that the fuel pressure did not exhibit the differential pressure drop within the second time period.

2. The method of claim 1, wherein the engine comprises a gas turbine auxiliary power unit mounted in an aircraft.

3. The method of claim 2, wherein the steps are performed when the aircraft is on the ground.

4. The method of claim 1, wherein the primary and secondary fuel shutoff valves comprise solenoid fuel shutoff valves.

5. A method for detecting shutoff valve failures in an engine fuel system, the method comprising the steps of:
   during a first test:
      commanding a secondary fuel shutoff valve to close;
      determining if a speed of the engine drops a first percentage within a first time period responsive to the commanding the secondary fuel shutoff valve to close;
      detecting that the secondary fuel shutoff valve is not operating correctly based on determining that the engine speed did not drop the first percentage within the first time period; and
   during a second test subsequent to the first test:
      commanding a primary fuel shutoff valve to close;
      determining if a speed of the engine drops a second percentage within a second time period responsive to the commanding the primary fuel shutoff valve to close; and
      detecting that the primary fuel shutoff valve is not operating correctly based on determining that the engine speed did not drop the second percentage within the second time period.

6. The method of claim 5, wherein the first percentage is equal to the second percentage.

7. The method of claim 5, wherein the first time period is equal to the second time period.

8. The method of claim 5, wherein the engine comprises a gas turbine auxiliary power unit mounted in an aircraft.

9. The method of claim 8, wherein the steps are performed when the aircraft is on the ground.

10. The method of claim 5, wherein the primary and secondary fuel shutoff valves comprise solenoid fuel shutoff valves.

11. A fuel system for an engine, comprising:
   a primary fuel shutoff valve including a primary fuel shutoff valve output;
   a secondary fuel shutoff valve including a secondary fuel shutoff valve input operatively coupled to the primary fuel shutoff valve output; and
   a pressure sensor operative to sense a fuel pressure downstream from the primary fuel shutoff valve;

wherein the system is configured to:
  command the secondary fuel shutoff valve to close;
  determine if a speed of the engine drops a first percentage within a first time period responsive to the commanding the secondary fuel shutoff valve to close;
  detect that the secondary fuel shutoff valve is not operating correctly based on determining that the engine speed did not drop the first percentage within the first time period;
  command the primary fuel shutoff valve to close;
  determine if the fuel pressure exhibits at least a differential pressure drop within a second time period responsive to commanding the primary fuel shutoff valve to close; and
  detect that the primary fuel shutoff valve is not operating correctly based on determining that the fuel pressure did not exhibit the differential pressure drop within the second time period.

12. The fuel system of claim 11, wherein the engine comprises a gas turbine auxiliary power unit mounted in an aircraft.

13. The fuel system of claim 12, wherein the steps are performed when the aircraft is on the ground.

14. The fuel system of claim 11, wherein the primary and secondary fuel shutoff valves comprise solenoid fuel shutoff valves.

15. The fuel system of claim 11, wherein the system is further configured to:
  during a first test:
    command the secondary fuel shutoff valve to close;
    determine if a speed of the engine drops a second percentage within a third time period responsive to the commanding the secondary fuel shutoff valve to close;
    detect that the secondary fuel shutoff valve is not operating correctly based on determining that the engine speed did not drop the second percentage within the third time period; and
  during a second test subsequent to the first test:
    command the primary fuel shutoff valve to close;
    determine if a speed of the engine drops a third percentage within a fourth time period responsive to commanding the primary fuel shutoff valve to close; and
    detect that the primary fuel shutoff valve is not operating correctly based on determining that the engine speed did not drop the third percentage within the fourth time period.

16. The fuel system of claim 15, wherein the second percentage is equal to the third percentage and the third time period is equal to the fourth time period.

17. The fuel system of claim 15, wherein the engine comprises a gas turbine auxiliary power unit mounted in an aircraft.

18. The fuel system of claim 17, wherein the steps are performed when the aircraft is on the ground.

19. The fuel system of claim 15, wherein the primary and secondary fuel shutoff valves comprise solenoid fuel shutoff valves.

20. The fuel system of claim 19, wherein an output of the primary fuel shutoff valve supplies fuel to a first engine fuel supply port,
  wherein an output of the secondary fuel shutoff valve supplies fuel to a second engine fuel supply port and to a third engine fuel supply port, and
  wherein the first engine fuel supply port includes a primary nozzle of a duplex nozzle and the third engine fuel supply port includes a secondary nozzle of the duplex nozzle.

* * * * *